(12) United States Patent
Jardim

(10) Patent No.: US 11,242,794 B2
(45) Date of Patent: Feb. 8, 2022

(54) EXHAUST CONNECTOR SYSTEM IN AUTOMOTIVE VEHICLE EXHAUST SYSTEMS

(71) Applicant: Marcos Graça Jardim, Maringa (BR)

(72) Inventor: Marcos Graça Jardim, Maringa (BR)

( * ) Notice: Subject to any disclaimer, the term of this patent is extended or adjusted under 35 U.S.C. 154(b) by 300 days.

(21) Appl. No.: 16/428,219

(22) Filed: May 31, 2019

(65) Prior Publication Data

US 2020/0309014 A1 Oct. 1, 2020

(30) Foreign Application Priority Data

Mar. 29, 2019 (BR) ...................... 10 2019 006492-7

(51) Int. Cl.
*F01N 13/18* (2010.01)
*F16L 23/08* (2006.01)
*F01N 13/08* (2010.01)

(52) U.S. Cl.
CPC ....... *F01N 13/1855* (2013.01); *F01N 13/082* (2013.01); *F16L 23/08* (2013.01)

(58) Field of Classification Search
CPC ............... F01N 13/082; F01N 13/1855; F01N 2240/36; F16L 23/08
See application file for complete search history.

(56) References Cited

U.S. PATENT DOCUMENTS

2002/0117051 A1* 8/2002 Yoh ...................... F15B 15/223
  92/85 B
2021/0025301 A1* 1/2021 Thomas ................ F01N 13/007

FOREIGN PATENT DOCUMENTS

CN 204573448 U * 8/2015

* cited by examiner

*Primary Examiner* — Anthony Ayala Delgado
(74) *Attorney, Agent, or Firm* — B. Aaron Schulman, Esq.; Stites & Harbison, PLLC

(57) ABSTRACT

A connector system for attaching diffusers to automotive vehicle exhaust systems which, in accordance with the characteristics thereof, provides a connector system in a specific structure of the mechanical type and based in an outlet nozzle with a groove flange, a tongue flange making the interface outlet nozzle-diffuser, an outlet connector with a tongue flange making the interface to the automotive vehicle exhaust system, a groove flange making the interface outlet connector-diffuser, and fixing clamps for the pairs of tongue-groove flanges, in order to provide complete optimization procedures to press fit and fasten the diffusers and their parts such as outlet nozzles and outlet connectors to automotive sports vehicle exhaust systems, coupled with a 360-degree double rotating system of their parts.

1 Claim, 10 Drawing Sheets

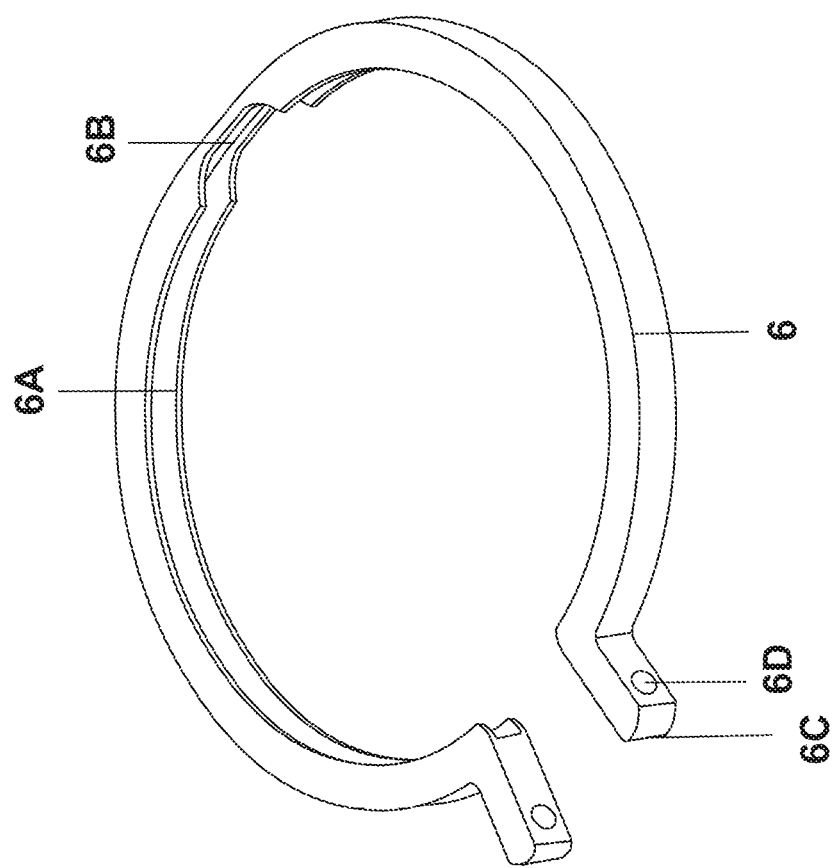

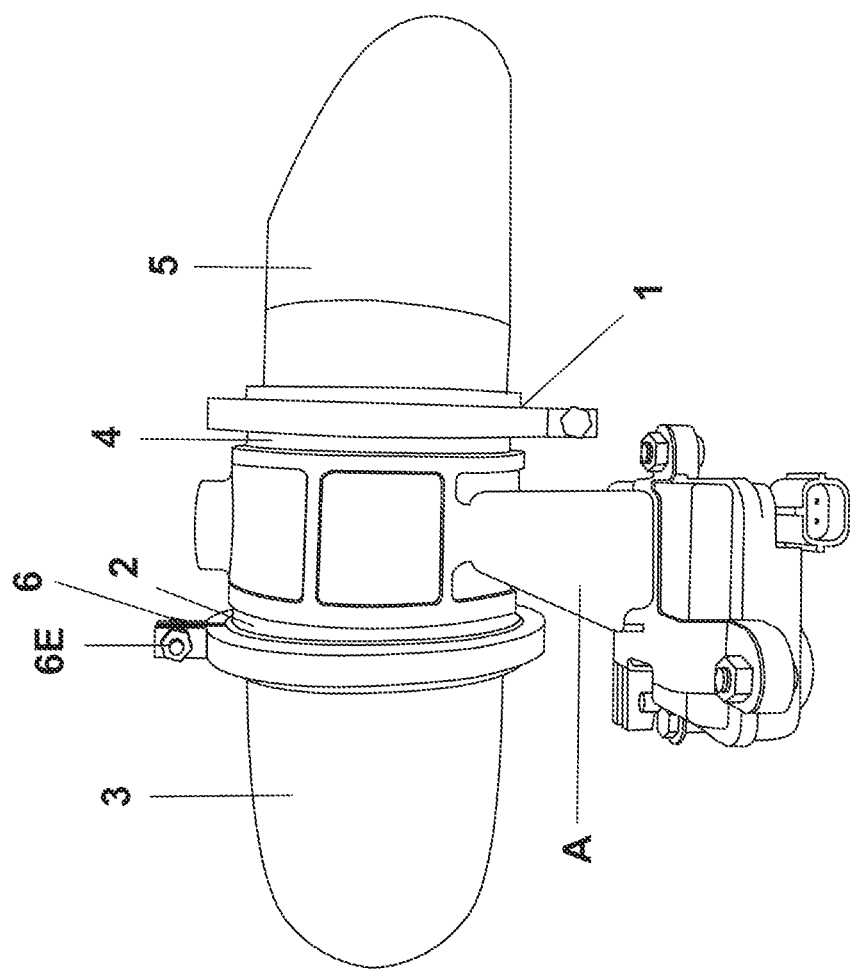

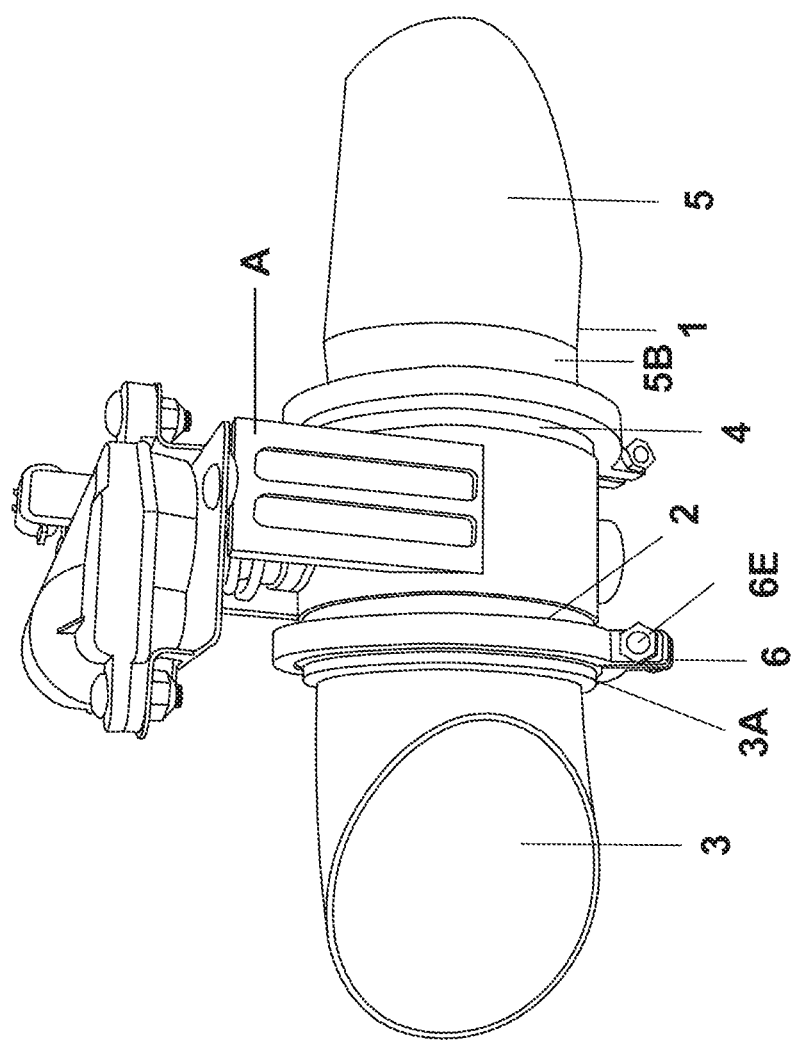

EXHAUST CONNECTOR SYSTEM IN AUTOMOTIVE VEHICLE EXHAUST SYSTEMS

FIELD OF THE INVENTION

The present invention relates to vehicle accessories in general, and more particularly, to a connector system for attaching diffusers to automotive vehicle exhaust systems which, according to the general characteristics thereof, provides, as its basic principle, a connector system in a proper, specific structure of mechanical type and based on an outlet nozzle with a groove flange, a tongue flange making the interface outlet nozzle-diffuser, an outlet connector with a tongue flange making the interface to the vehicle exhaust system, a groove flange making the interface outlet connector-diffuser, and two fixing clamps for the pairs of tongue-groove flanges, in order to provide, in an extremely practical, safe and accurate manner, complete optimization procedures to press fit and fasten diffusers and their parts such as outlet nozzles and outlet connectors to sports cars exhaust systems in general, combined with a 360-degree double rotating system of their parts and being based on a connector system of high strength, safety and versatility.

DISCUSSION OF THE PRIOR ART

With a specific design and format and easy access for better adaptation and user safety, convenience features in handling and functionality, very affordable and, due to its general characteristics and dimensions, easily adaptable to a variety of diffusers, exhaust systems, automotive vehicles, places and users in general, regardless of the characteristics that they may present.

Diffusers are automotive electronic devices, more particularly, accessories for automotive vehicles in general such as cars, directly installed in the automotive vehicle exhaust system so as to divert airflow and ensure change or modification in the sound made by automotive vehicles, thus producing a distinctive sports roaring sound when the engine is running. Diffusers allow the user to switch between original sound and sports sound when so desired by means of a power switch.

More specifically, a diffuser is usually located on the bottom rear of the vehicle and its aerodynamic purpose is to increase airflow speed underneath the vehicle, that is, air pressure underneath the vehicle is affected by the diffuser as the vehicle moves.

When installed in automotive vehicles, diffusers allow burning of not-expelled exhaust gas, prevent normal exhaust gas flow, reduce hydrocarbon exhaust emissions, reuse gasoline without the danger of lead poisoning and reduce carbo monoxide emissions.

As a fully exposed part at vehicle exhaust systems, diffusers must be highly functional and efficient to divert airflow and ensure better sound quality, besides being provided with a pleasant design and excellent finish details.

However, despite being widely used for a long time in the most diverse types of exhaust systems from a wide range of automotive vehicles, well-known diffusers in the current state of the art present several drawbacks in their use such as high complexity in the installation/uninstallation procedures and routine maintenance, especially in the attachment of other parts from the exhaust system such as outlet nozzles and side connectors.

In this line of action, the structuring of a practical, safe, accurate and ergonomic clamp which is largely able to fully adapt to the outlets of automotive vehicle exhaust systems and press fit and fasten the outlet nozzles and side connectors to the end sections of diffusers in automotive vehicles exhaust systems in general has become indispensable for both manufacturers and users of these types of vehicle diffusers.

In an extensive review of the literature aiming to establish the current stat of the art on diffusers for automotive vehicles in general, mainly a connector system for attaching automotive vehicle diffusers, no relevant prior art documents disclosing the specific object claimed in the present invention were found, namely, no document disclosing a connector system for attaching diffusers to automotive vehicle exhaust systems by means of press fitting outlet nozzles and outlet connectors via tongue and groove flanges and fastening thereof via fixing clamps, as well as enabling routine handling procedures—maintenance and replacement.

SUMMARY OF THE INVENTION

Thus, the overall design of the present connector system for attaching diffusers to automotive vehicle exhaust systems, object of the present invention, is entirely based on a simple and robust structure with a required minimum number of components and extremely simplified, safe and optimized applicability, combined with fairly practical manufacturing and maintenance procedures so as to produce a practical and efficient connector system that is able to press fit and fasten the parts making up a diffuser such as outlet nozzles and side connectors directly to its body by means of pairs of tongue-groove flanges and adjustable fixing clamps.

More specifically, the diffuser is provided with a groove flange welded to the outlet connector fastening side and a tongue flange welded to the outlet nozzle fastening side, just as the side connector is provided with a tongue flange and the outlet nozzle is provided with a groove flange; the fastening of all of these pairs of tongue-groove flanges with each other being necessarily carried out by proper adjustable fixing clamps so as the diffuser structure consisting of its outlet nozzle with a groove flange and its outlet connector with a tongue flange allows the rotation thereof in a fully manual manner—a 360-degree double rotating system, thus making it easier to attach the assembly to the vehicle.

The present invention is based on the application of components and processes in a differentiated concept which will meet the several requirements the nature of its use demands, that is, attachment of diffusers to automotive vehicle exhaust systems. That concept ensures a connector system of great efficiency, functionality, strength, durability, safety, versatility, accuracy, economy, and ergonomics due to the excellent aggregate technical qualities, which provide advantages and improvements in the procedures of installation, usage and maintenance of diffusers at automotive vehicle exhaust systems in general and whose general characteristics differ from the other shapes and models widely known in the current state of the art.

The present invention comprises the use of a modern, efficient, safe and functional connector system for attaching diffusers to automotive vehicle exhaust systems formed by a set of properly incorporated mechanical and vehicle solutions, forming a complete and differentiated connector system with a unique design, great finish details and specific characteristics, which incorporates its own specific stand-alone structure of the mechanical type, of high durability and strength, and containing a properly integrated and symmetrically arranged outlet nozzle with a groove flange as an external element of the diffuser and for the outflow of gases from the automotive vehicle, a tongue flange as a connecting element between the outlet nozzle and the diffuser, an outlet connector with a tongue flange as a connecting element of the diffuser to the automotive vehicle exhaust system, a groove flange as a connecting element between the outlet connector and the diffuser, and two fixing clamps as outer fastening elements of the pairs of tongue and groove flanges for the diffuser, in order to make it possible to form a single, complete and safe assembly, whose shapes and internal and external arrangements enable seamless adaptation to automotive vehicle diffusers in general, and specially designed for these purposes with proper geometry.

The present connector system is based on the application of components and processes in a differentiated concept without, however, achieving a high degree of sophistication and complexity, thus making it possible to solve some of the drawbacks of other shapes and models known in the state of the art and employed in the procedures to attach diffusers and their parts directly to the output of automotive vehicle exhaust systems in general, which are located in an operating range in which are very common the limitations on use and application, low efficiency and performance, accidents of different severities, high insecurity, great wear and fragility, low durability and strength, low versatility, high losses, no ergonomics, low performance, high inaccuracy, high cost, general high volume and weight, laborious applications, high maintenance, great waste of time and complex manufacturing process.

FIG. 4 is a perspective view of the clamp of the connector system for attaching diffusers to automotive vehicle exhaust systems.

FIG. 5A is a left side view of the connector system for attaching diffusers to automotive vehicle exhaust systems.

FIG. 5B is a perspective view of the connector system for attaching diffusers to automotive vehicle exhaust systems.

Figure 1:
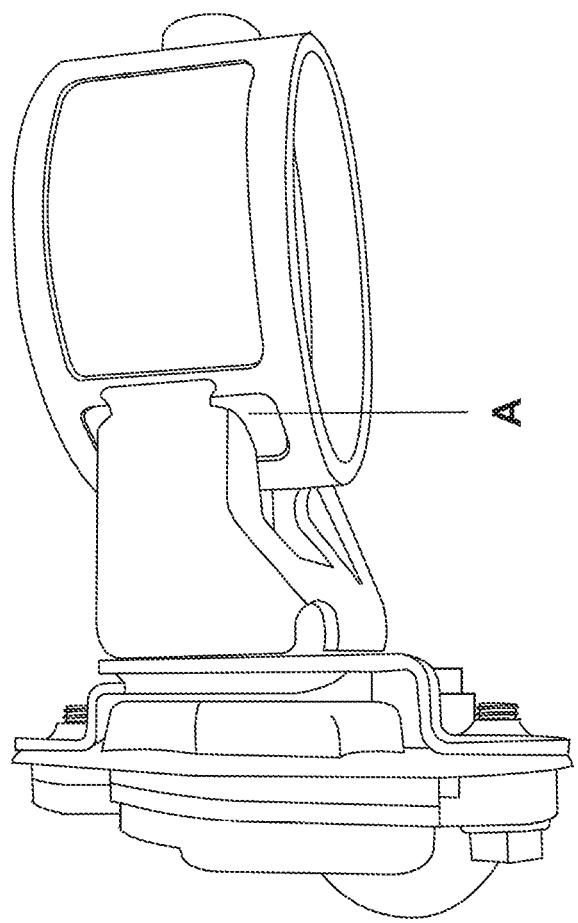
FIG. 1 is a perspective view of a diffuser for automotive vehicle exhaust systems.
Figure 2B:
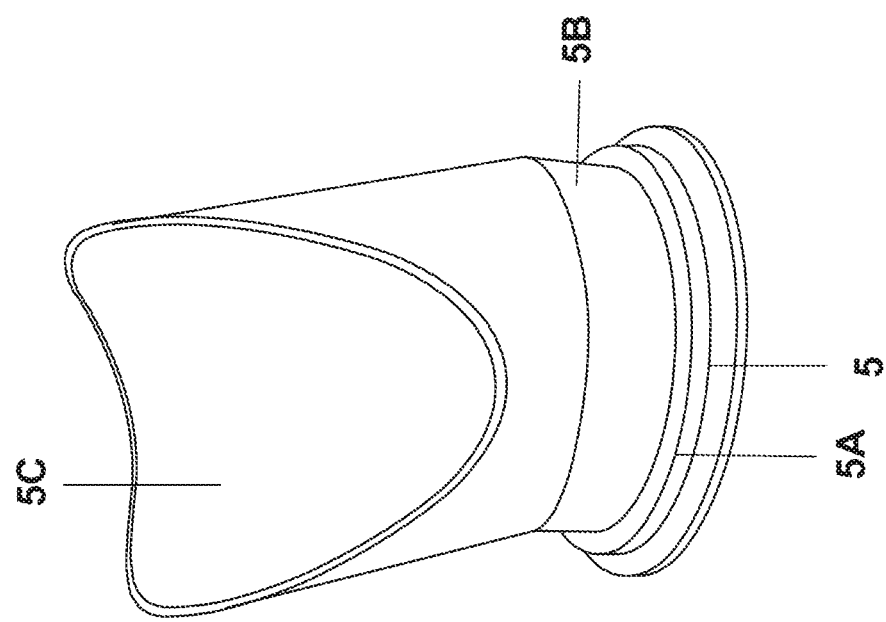
FIG. 2B is a perspective view of the side connector of the connector system for attaching diffusers to automotive vehicle exhaust systems.
Figure 2A:
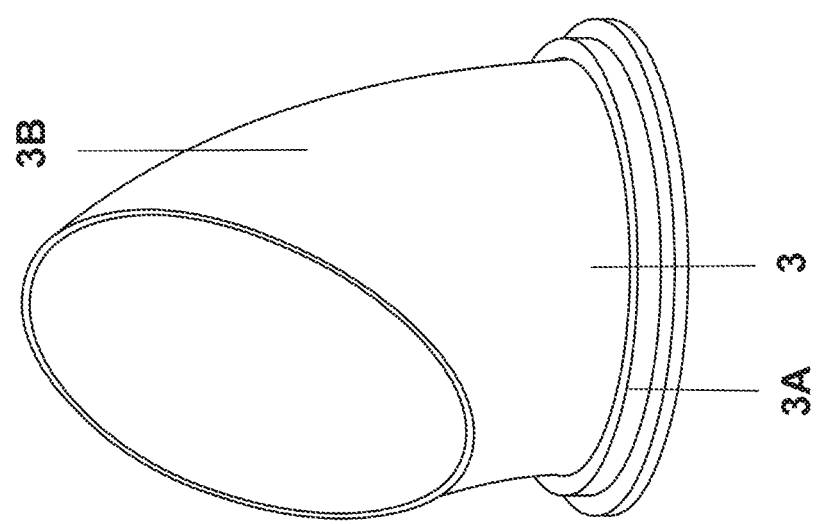
FIG. 2A is a perspective view of the outlet nozzle of the connector system for attaching diffusers to automotive vehicle exhaust systems.
Figure 3B:
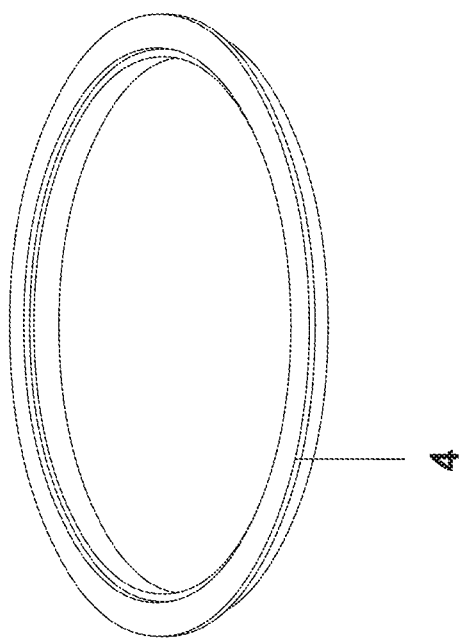
FIG. 3B is a perspective view of the tongue flange of the connector system for attaching diffusers to automotive vehicle exhaust systems.
Figure 3A:
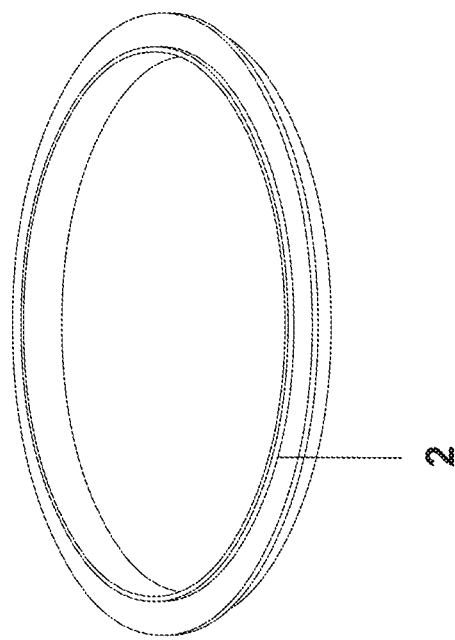
FIG. 3A is a perspective view of the groove flange of the connector system for attaching diffusers to automotive vehicle exhaust systems.
Figure 5C:
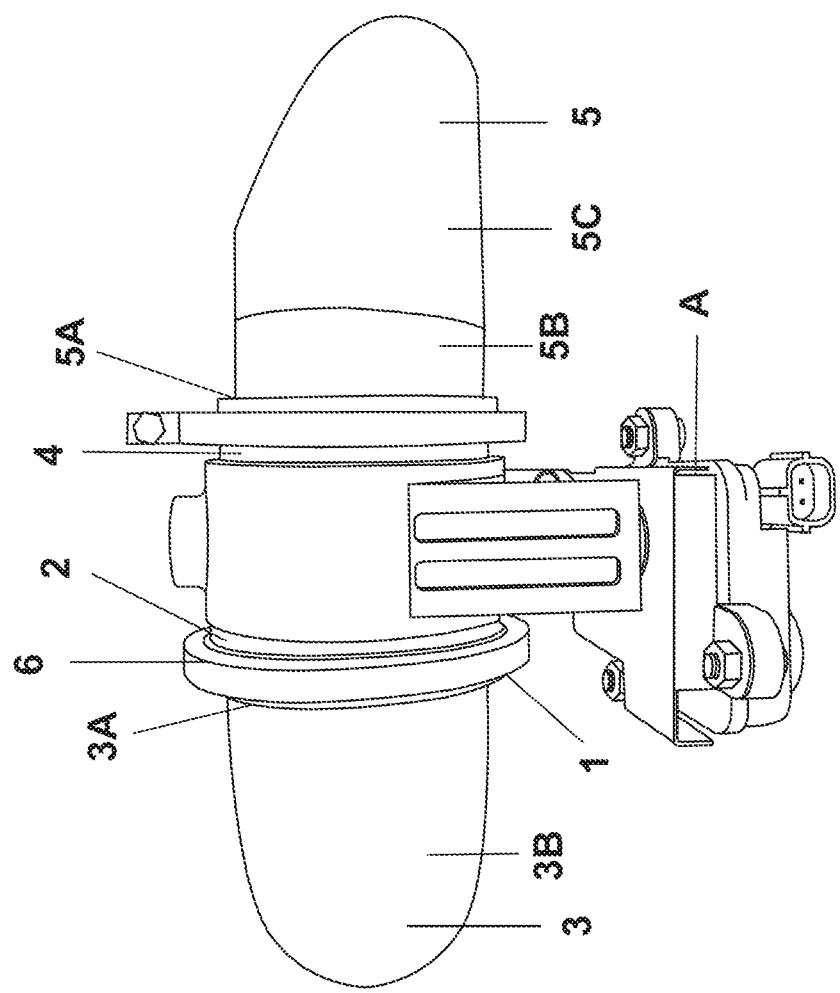
FIG. 5C is a top plan view of the connector system for attaching diffusers to automotive vehicle exhaust systems.
Figure 5D:
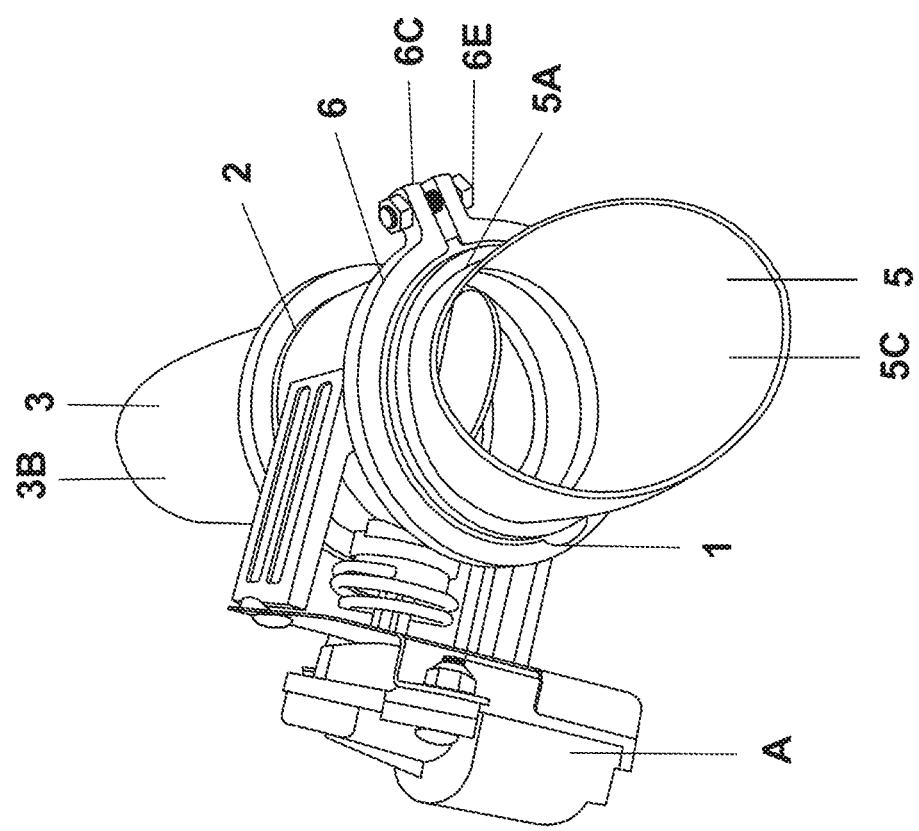
FIG. 5D is a left side view of the connector system for attaching diffusers to automotive vehicle exhaust systems.
Figure 5E:
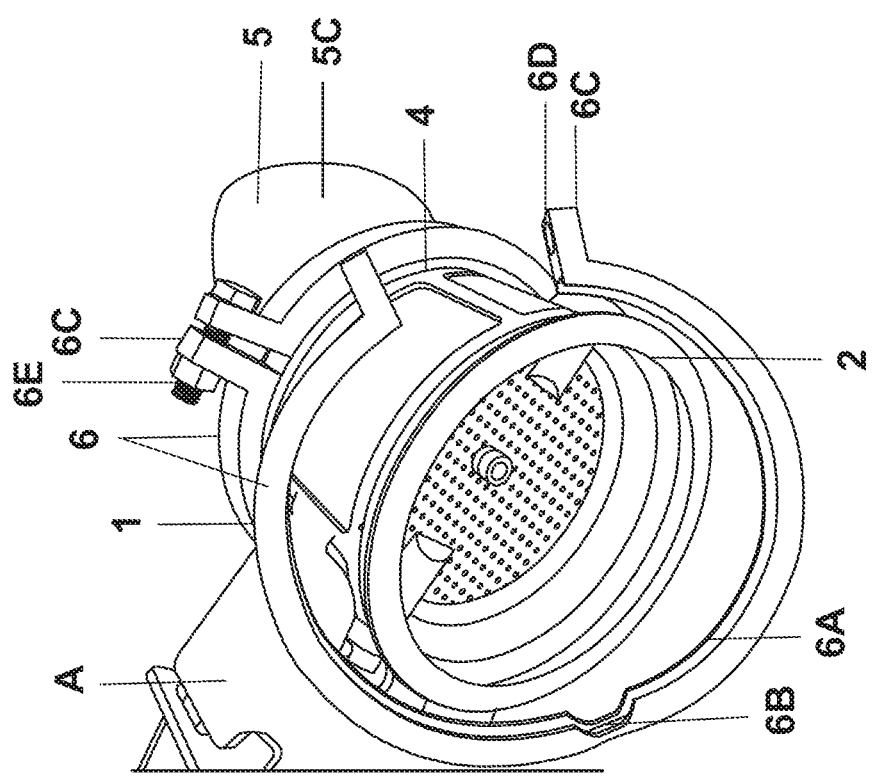
FIG. 5E is a perspective view of the connector system for attaching diffusers to automotive vehicle exhaust systems without the outlet nozzle and with the clamp in an open position.
Figure 5F:
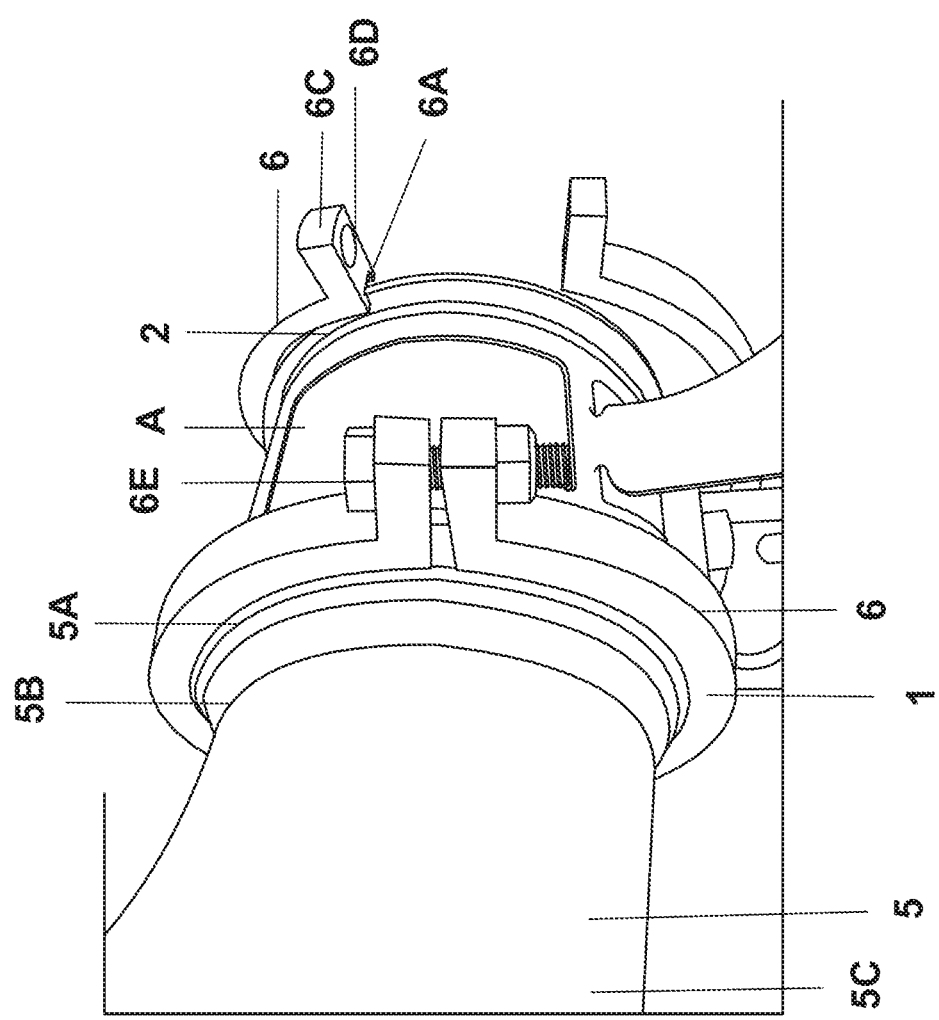
FIG. 5F is a perspective view of the connector system for attaching diffusers to automotive vehicle exhaust systems without the outlet nozzle and with the clamp in an open position.

As it can be inferred from the attached figures illustrating and integrating the present descriptive report of the invention "Connector System for Attaching Diffusers to Automotive Vehicle Exhaust Systems", the connector system is shown in FIG. (1A) in a general manner, as consisting of a connector system (1) complete and having unique characteristics, which incorporates a specific and stand-alone structure of the mechanical type, internal and external shapes and arrangements adaptable to diffusers (A) used in automotive vehicle exhaust systems, of high durability and resistance, and which contains, perfectly integrated and symmetrically arranged between them a groove flange (2) of annular shape perpendicularly and symmetrically arranged around the entire length of the diffuser (A) end sections—end face connecting the diffuser (A) and the outlet nozzle with a groove flange (3); an outlet nozzle with a groove flange (3) of curved shape parallel and symmetrically arranged via its lower surfaces on the tongue flange (2) and consisting of an annular groove flange (3A) horizontally and symmetrically arranged around the entire length of the lower side of the outlet nozzle with the groove flange (3), and a conduit (3B) of chamfered curved shape perpendicularly and symmetrically centered on the groove flange upper surface (3A); an annular groove flange (4) perpendicularly and symmetrically arranged around the entire length of the diffuser (A) input ends—end face connecting the diffuser (A) and the outlet connector with a tongue flange (5); an outlet connector with a tongue flange (5) of curved shape parallel and symmetrically arranged via its lower surfaces on the groove flange (4) and consisting of an annular tongue flange (5A) horizontally and symmetrically arranged on the entire length of the lower side of the outlet connector with a tongue flange (5), a cylindrical support (5B) perpendicularly and symmetrically centered on the tongue flange upper surface (5A), and a cylindrical conduit (5C) with a convex cutout perpendicularly and symmetrically arranged on the support (5B) upper ends; and two fixing clamps (6) of annular shape each one of them symmetrically arranged around the entire length of the outer edges of a pair of tongue and groove flanges—a tongue flange (2) of the diffuser (A) and a groove flange (3A) of the outlet nozzle with a groove flange (3) and a groove flange (4) of the diffuser (A) and the tongue flange (5A) of the outlet connector with a tongue flange (5) and consisting of a longitudinal side groove (6A) of annular shape with a semi-elliptical cross-section symmetrically arranged around the entire length of the inner surface, a rear cross-sectional groove (6B) of semi-elliptical shape symmetrically centered on the inner-rear surface, two attaching tips (6C) of parallelepipedal shape symmetrically arranged on the free end, a center opening (6D) of cylindrical shape horizontally and symmetrically centered and transversely arranged, and a fastening bolt with nut (6E) symmetrically and transversely arranged consecutively to the two center openings (6D).

The application of said connector system for attaching diffusers to automotive vehicle exhaust systems is based on the perfect fitting of the outlet nozzle with a groove flange (3) and the outlet connector with a tongue flange (5) around the diffuser (A) side end sections by means of the fixing clamps (6). Thus, the diffuser (A) must be provided with a groove flange (4) attached to the fastening side of the outlet connector with a tongue flange (5) and a tongue flange (2) attached to the fastening side of the outlet nozzle with a groove flange (3). It should be noted that the side connector with a tongue flange (5) is provided with a tongue flange (5A) and the outlet nozzle with a groove flange (3) is provided with a groove flange (3A). Fastening of the outlet nozzle with a groove flange (3) to the tongue flange (2) and of the side connector with a tongue flange (5) to the groove flange (5A) are necessarily carried out by fixing clamps (6) around the joining area thereof.

The application of the grooved clamp for diffusers in automotive vehicle exhaust systems is based on the perfect positioning on and around the entire length of the diffuser (C) tongue and groove flanges and the outlet nozzle (A) and the side connector (B). The diffuser (C) allows fitting of the outlet nozzles and the side connectors directly to its body by means of pairs of tongue and groove flanges, that is, the diffuser (C) is provided with a groove flange welded to the fastening side of the side connector (B) and a tongue flange welded to the fastening side of the outlet nozzle (A), just as the side connector is provided with a tongue flange and the outlet nozzle (A) is provided with a groove flange.

Thus, the grooved clamps (1) are symmetrically arranged on and around the entire length of the outer edges of the tongue and groove flanges between the outlet nozzle (A) and the diffuser (C) and between the side connector (B) and the diffuser (C). Once fitted, the clamps are fastened and pressed on and around the tongue and groove flanges by the fastening bolts and nuts (5).

Since the components of the connector system for attaching diffusers to automotive vehicle exhaust systems are fully integrated between them, nothing unfastens and breaks or tears, attaining a high level of performance and efficiency, combined with high durability and absolute safety. Once the components are fully integrated between them, they are maintained fitted and cohesive to prevent detachment when in use, the set being fully available for the fastening procedures of the diffuser (A) and its parts to automotive vehicle exhaust systems in general. Therefore, the connector system (1) can be used without concerns of any nature, especially regarding the durability and safety of its components, as well as the users' safety.

Considering the foregoing, the present vehicle accessory will be well received by sports cars exhaust system users in general, since the connector system for attaching diffusers to automotive vehicle exhaust systems has several advantages, such as: great safety, reliability and ease of application; great efficiency and performance in its application due to its general conception; high comfort, convenience and safety to users; extremely high general resistance and durability, coupled with a low or absent wear of the set as a whole; completely affordable costs which provides excellent cost-benefit ratio; practical and safe use by any user; wide reach range; extremely low and practical general maintenance; perfect and direct adaptation to diffusers (A) of automotive vehicles; high operational accuracy; fully compatible weight and general dimensions; high ergonomics; excellent structural capacity; excellent capacity of coordinating and regulating components; and the certainty of having a connector system (1) that fully meets the law and regulations in force and the basic conditions necessary to its application.

Due to its features the connector system for attaching diffusers to automotive vehicle exhaust systems is totally versatile, efficient, practical and safe to be applied to the routine procedures of manually attaching (press fitting and fastening) outlet nozzles (3) and outlet connectors (5) directly to the most diverse types of diffusers (A), to the most diverse types of automotive vehicles and the most diverse types of users, regardless of the general characteristics these may present; it is also characterized by a great ease of application and handling, combined with great performance and excellent general characteristics; however, the measures, sizes and quantities may vary according to the needs.

The invention claimed is:

1. An exhaust connector system in automotive vehicle exhaust system, comprising a connector system incorporating a structure integrated to the diffusers and containing integrated and symmetrically arranged between them a first tongue flange of annular shape and perpendicularly and symmetrically arranged around the entire length of the diffuser output ends—connecting the diffuser to an outlet nozzle; the outlet nozzle of curved shape parallel and symmetrically arranged via its lower surfaces on the first tongue flange and consisting of a first groove flange of annular shape horizontally and symmetrically arranged on the entire length of the lower side of the outlet nozzle, and a conduit of chamfered curved shape perpendicularly and symmetrically centered on the first groove flange upper surface; a second groove flange of annular shape and perpendicularly and symmetrically arranged around the entire length of the diffuser input ends—connecting the diffuser to an outlet connector; an outlet connector of curved shape parallel and symmetrically arranged via its lower surfaces on the second groove flange and consisting of a second tongue flange of annular shape horizontally and symmetrically arranged on the entire length of the lower side of the outlet connector, a support of cylindrical shape perpendicularly and symmetrically centered on the second tongue flange upper surface, and a conduit of cylindrical shape with a convex cutout perpendicularly and symmetrically arranged on the support upper ends; and two fixing clamps of annular shape each symmetrically arranged around the entire length of the outer edges of a pair of tongue-groove flanges—the first tongue flange of the diffuser and the first groove flange of the outlet nozzle and the second groove flange of the diffuser and the second tongue flange of the outlet connector and consisting of a longitudinal side groove of annular shape with a semi-elliptical cross-section symmetrically arranged around the entire length of the inner surface, a rear cross-sectional groove of semi-elliptical shape symmetrically centered on the rear-inner surface, two attaching tips of parallelepipedal shape symmetrically arranged on the free end, a center opening of cylindrical shape horizontally and symmetrically centered and transversely arranged, and a fastening bolt and nut symmetrically and transversely arranged consecutively to the two center openings.

* * * * *